(12) United States Patent
Kain

(10) Patent No.: US 12,096,763 B2
(45) Date of Patent: Sep. 24, 2024

(54) UNDERGROUND PEST CONTROL DEVICE

(71) Applicant: Stan Robert Kain, Atascadero, CA (US)

(72) Inventor: Stan Robert Kain, Atascadero, CA (US)

(*) Notice: Subject to any disclaimer, the term of this patent is extended or adjusted under 35 U.S.C. 154(b) by 0 days.

(21) Appl. No.: 18/317,299

(22) Filed: May 15, 2023

(65) Prior Publication Data

US 2024/0215565 A1    Jul. 4, 2024

Related U.S. Application Data

(60) Provisional application No. 63/478,256, filed on Jan. 3, 2023.

(51) Int. Cl.
*A01G 13/10* (2006.01)
*A01M 29/30* (2011.01)

(52) U.S. Cl.
CPC .............. *A01M 29/30* (2013.01); *A01G 13/10* (2013.01)

(58) Field of Classification Search
CPC ............................... A01M 29/00; A01G 13/10
See application file for complete search history.

(56) References Cited

U.S. PATENT DOCUMENTS

| | | | |
|---|---|---|---|
| 1,689,017 A * | 4/1927 | Fewkes | A01G 13/0237 |
| 5,509,229 A * | 4/1996 | Thomasson | A01G 13/02 47/21 |
| 6,067,752 A | 5/2000 | Bryan et al. | |
| 7,533,488 B2 | 5/2009 | Singer | |
| 9,271,486 B2 | 3/2016 | Messina | |
| 9,307,702 B1 | 4/2016 | Lauer | |
| 2013/0174480 A1 | 7/2013 | Gabelmann | |
| 2014/0325904 A1 * | 11/2014 | Brown | A01G 9/02 |
| 2016/0120137 A1 * | 5/2016 | Toye | A01G 13/10 |
| 2016/0242405 A1 * | 8/2016 | Zhang | A01M 13/00 |
| 2018/0332779 A1 * | 11/2018 | Reach | A01G 13/02 |

* cited by examiner

*Primary Examiner* — Joshua J Michener
*Assistant Examiner* — Henry Hooper Mudd

(57) ABSTRACT

The underground pest control device is intended to provide users with an apparatus that can repel gophers and similar burrowing animals. To accomplish this, the device includes an abrasive protective installation that may be positioned within the soil, below gardens, flower beds, shrubberies, pools, etc., where gophers or other burrowing animals may become a nuisance. Further, a plurality of fasteners may be integrated into the installation, to hold the panels in place. Furthermore, the device may be integrated into planters or other enclosed structures that are also prone to such pests. Additionally, the device may include repellents that may be used in a safe way in association with the abrasive installation.

15 Claims, 4 Drawing Sheets

UNDERGROUND PEST CONTROL DEVICE

FIELD OF THE INVENTION

The present invention relates generally to an underground pest control device. More specifically, the present invention relates to a protective device that may be installed below the soil to prevent gophers/moles from entering a planted area.

BACKGROUND OF THE INVENTION

Groundhogs, moles, gophers, prairie dogs, chipmunks, and other burrowing animals are persistent problems in all areas of the world. In order to control such pests, people have resorted to various methods to eradicate them, such as poisons and traps. Poisons are effective but pose a risk to all other living things that come near including family, pets and young children. Traps are effective, but they do very little in the long run to stop the problem. They also take a great deal of time for users to so set them up, check, and then dispose of the dead animal that often dies a horrifying death. Accordingly, there exists a need for a means by which burrowing animals can be repelled from certain underground areas without the disadvantages as described above.

An objective of the present invention is to provide users with an apparatus that can repel gophers and similar burrowing animals. To accomplish this, the present invention comprises an abrasive protective installation that may be positioned within the soil, below gardens, flower beds, planters, shrubberies, pools etc. where gophers or other burrowing animals may become a nuisance. Further, the present invention may comprise repellents that may be used in a safe way in association with the abrasive installation.

SUMMARY OF THE INVENTION

The underground pest control device is intended to provide users with an apparatus that can repel gophers and similar burrowing animals. To accomplish this, the present invention comprises an abrasive protective installation that may be positioned within the soil or any medium of growth, such as below gardens, flower beds, shrubberies, pools etc. where gophers or other burrowing animals may become a nuisance. Further, a plurality of fasteners may be integrated into the installation, to hold multiple panels in place. Furthermore, the device may be integrated into planters or other enclosed structures that are also prone to underground pests. Additionally, the present invention may comprise repellents that may be used in a safe way in association with the abrasive installation.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 4, the present invention is an underground pest control device. An objective of the present invention is to provide users with an apparatus that can repel gophers and similar burrowing animals. To accomplish this, the present invention comprises an abrasive installation that may be positioned within the soil, below gardens, flower beds, planters, shrubberies, pools etc. where gophers or other burrowing animals may become a nuisance. Further, the present invention may comprise repellents that may be used in a safe way in association with the abrasive installation.

Figure 1:
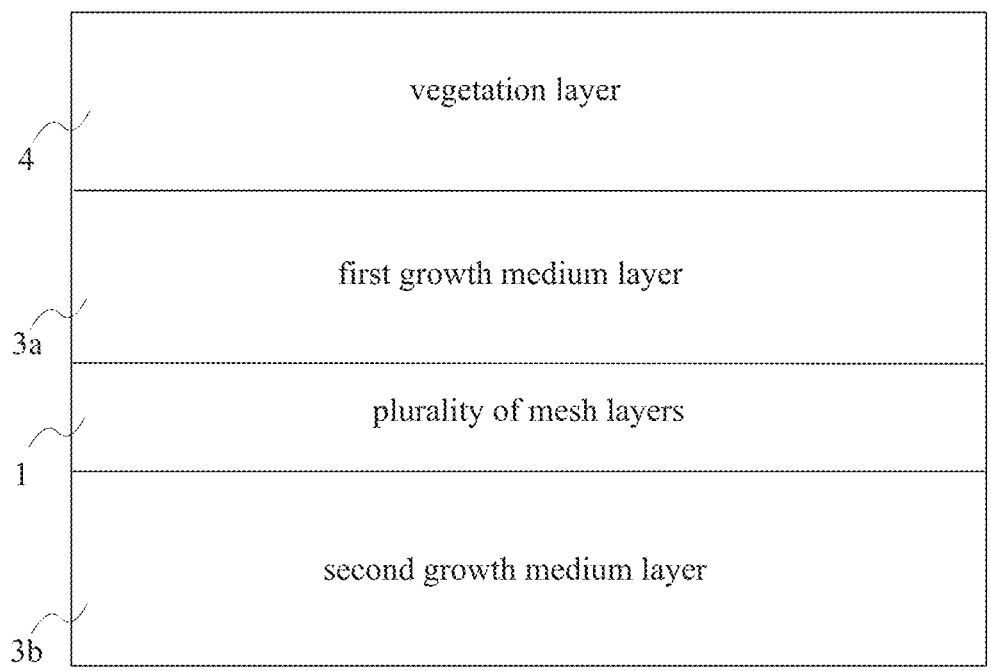
FIG. 1 is a schematic representation of the present invention.
Figure 2:
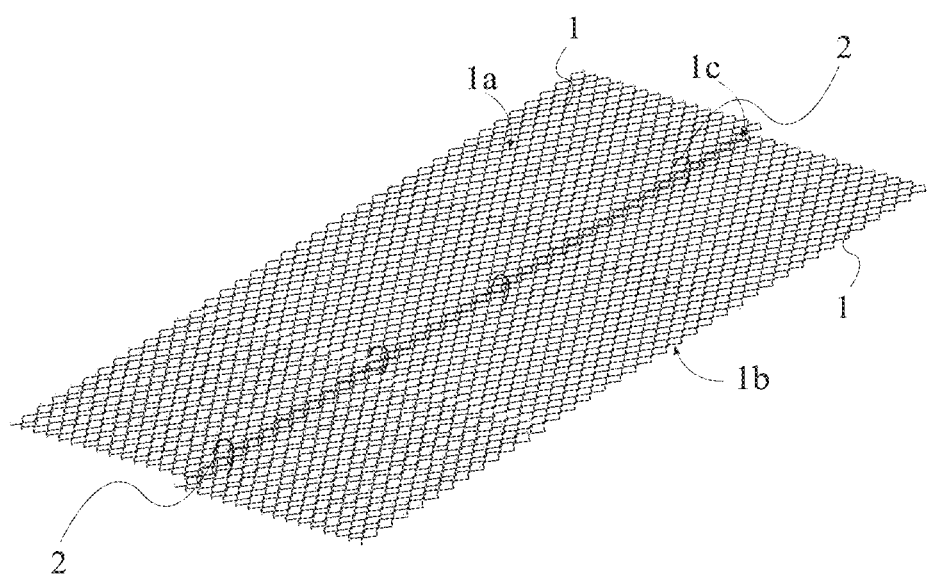
FIG. 2 is a front perspective view of a plurality of mesh panels and a plurality of fasteners according to the present invention.
Figure 3:
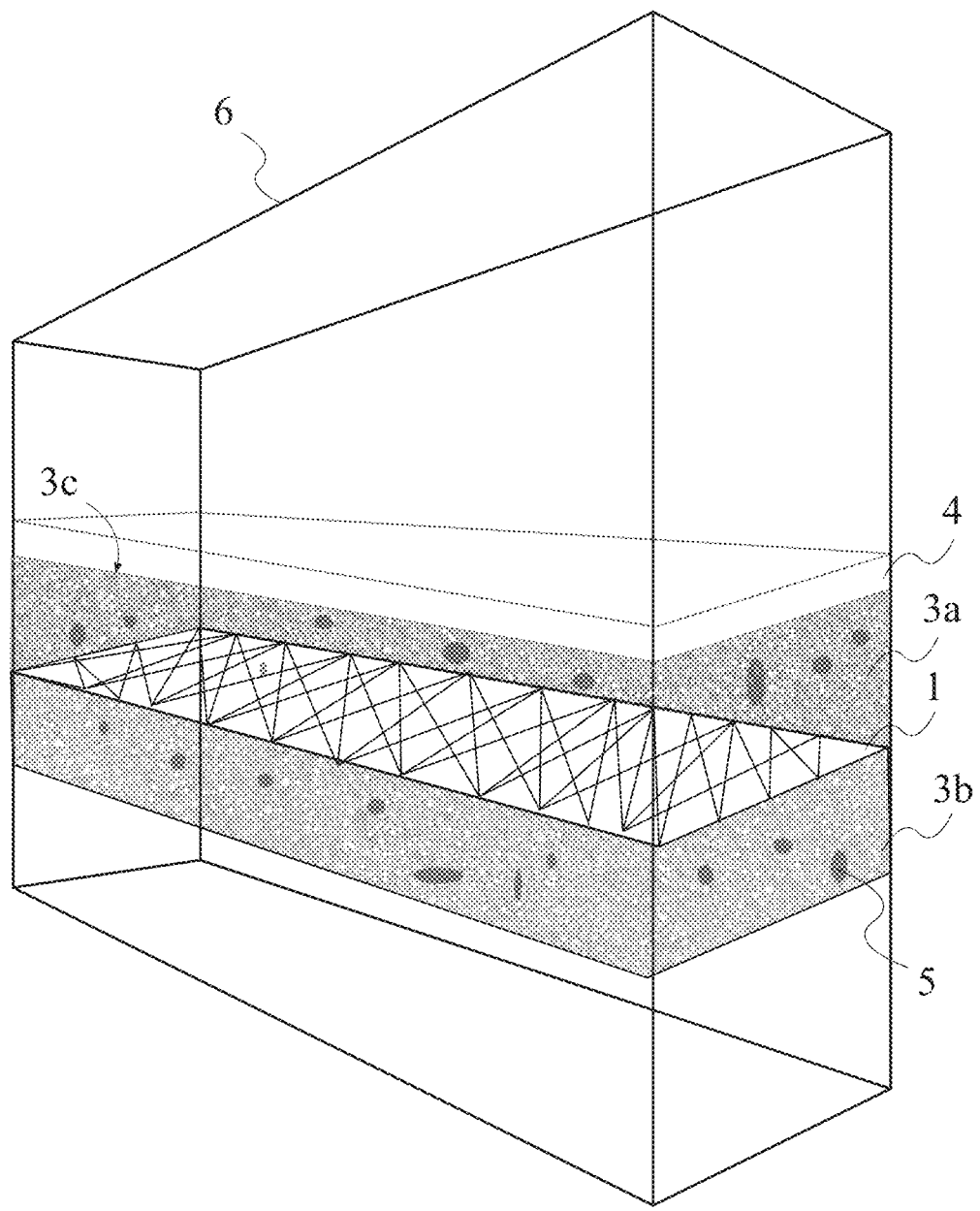
FIG. 3 is a top front schematic view of the present invention within a planter box.

The following description is in reference to FIG. 1 through FIG. 3. According to a preferred embodiment, the present invention comprises a mesh panel 1, a plurality of fasteners 2, a first growth medium layer 3a, a second growth medium layer 3b, and a vegetation layer 4. Preferably, the mesh panel 1 comprises a lightweight metal panel that is to needed size and placed in the ground one to two feet down around the area to be protected. Further, the mesh panel 1 is made of a non-rusting metal with an exterior abrasive surface, similar to the nature of a cheese grater. In other words, the mesh panel 1 is abrasive. The sharp abrasive surface of the mesh panel 1 repels the pests or burrowing animals. More specifically, the abrasive surface may be formed in a die cut stamping method. The size of the mesh panel 1 is cut to the size of the land on which the vegetation would be planted. The mesh panel 1 may be a single panel or a combination of a plurality of mesh panels that are arranged in appropriate ways to match with the terrain and size of the vegetation that needs protection. In such cases a first surface 1a of each of the plurality of mesh panels is positioned opposite to a second surface 1b of each of the plurality of mesh panels across the mesh panels, and both the first surface 1a and the second surface 1b are abrasive. Furthermore, the mesh panel 1 may have a planar edge or slightly curved abrasive edges to further block the pathways of the burrowing animals and thus protect the plants above the panels. In other words, the mesh panel 1 may comprise any other size, material, components, arrangement of components etc. that are known to a person of ordinary skill in the art, as long as the objectives of the present invention are fulfilled.

In order to hold the mesh panel 1 in place, the plurality of fasteners 2 is used. In other words, the plurality of fasteners 2 may be integrated across the mesh panel 1 in such a way that the panels don't move around. To that end the plurality of fasteners 2 is integrated along terminal edges 1c of the mesh panel 1. More specifically, the plurality of fasteners 2 interconnects the mesh panel 1 along a horizontal plane. Preferably, the plurality of fasteners 2 are aluminum zip ties, or horse-shoe shaped clips or U-clips. However, the plurality of fasteners 2 may comprise any other size, shape, kind, location, orientation, technology etc. that are known to one of ordinary skill in the art, as long as the intents of the present invention are not altered.

According to the preferred embodiment, the first growth medium layer 3a is a foundation layer that enables and promotes growth of plants or any vegetation. Accordingly, the first growth medium layer 3a may comprise different kinds of materials such as soil, mulch, hay, potting mix, mud, etc. that enables plant growth. In the preferred embodiment, the mesh panel 1 is positioned between the first growth medium layer 3a and the second growth medium layer 3b. More specifically, the first growth medium layer 3a is positioned over the second growth medium layer 3b, wherein the first growth medium layer is laterally offset from the second growth medium layer. Preferably, the first growth medium layer 3a and the second growth medium layer 3b comprise soil. In other words, the first growth medium layer 3a is a top layer of soil and the second growth medium layer 3b is a bottom layer of soil. As seen in FIG. 3, the vegetation layer 4 is integrated along the first growth medium layer 3a, and the mesh panel 1 is laterally offset from the vegetation layer 4. More specifically, the at least one mesh panel 1 is positioned between the first growth medium layer 3a and the second growth medium layer 3b, such that the mesh panel 1 separates the layer of soil below the mesh panel 1 as the second growth medium layer 3b and the layer of soil above the mesh panel where plants are grown as the first growth medium layer 3a. This arrangement obstructs burrowing animals or pests from entering into the top layer or vegetation layer 4 from the second growth medium layer 3b or from underground. As seen in FIG. 3 the vegetation layer 4 is distributed along a first surface 3c of the first growth medium layer 3a.

To further the repelling features of the invention, the present invention comprises a pest repellant 5, wherein the pest repellant 5 is distributed between the first growth medium layer 3a and the second growth medium layer 3b. To that end, an installation kit of the present invention may also include a pest repellant 5, which could be positioned within a perforated and bio-degradable packing such as a tea bag. Examples of the pest repellant 5 include but are not limited to, mint, peppermint, capsaicin, or a combination thereof, etc. Preferably, the pest repellant 5 is positioned adjacent to the mesh panel 1.

Figure 4:
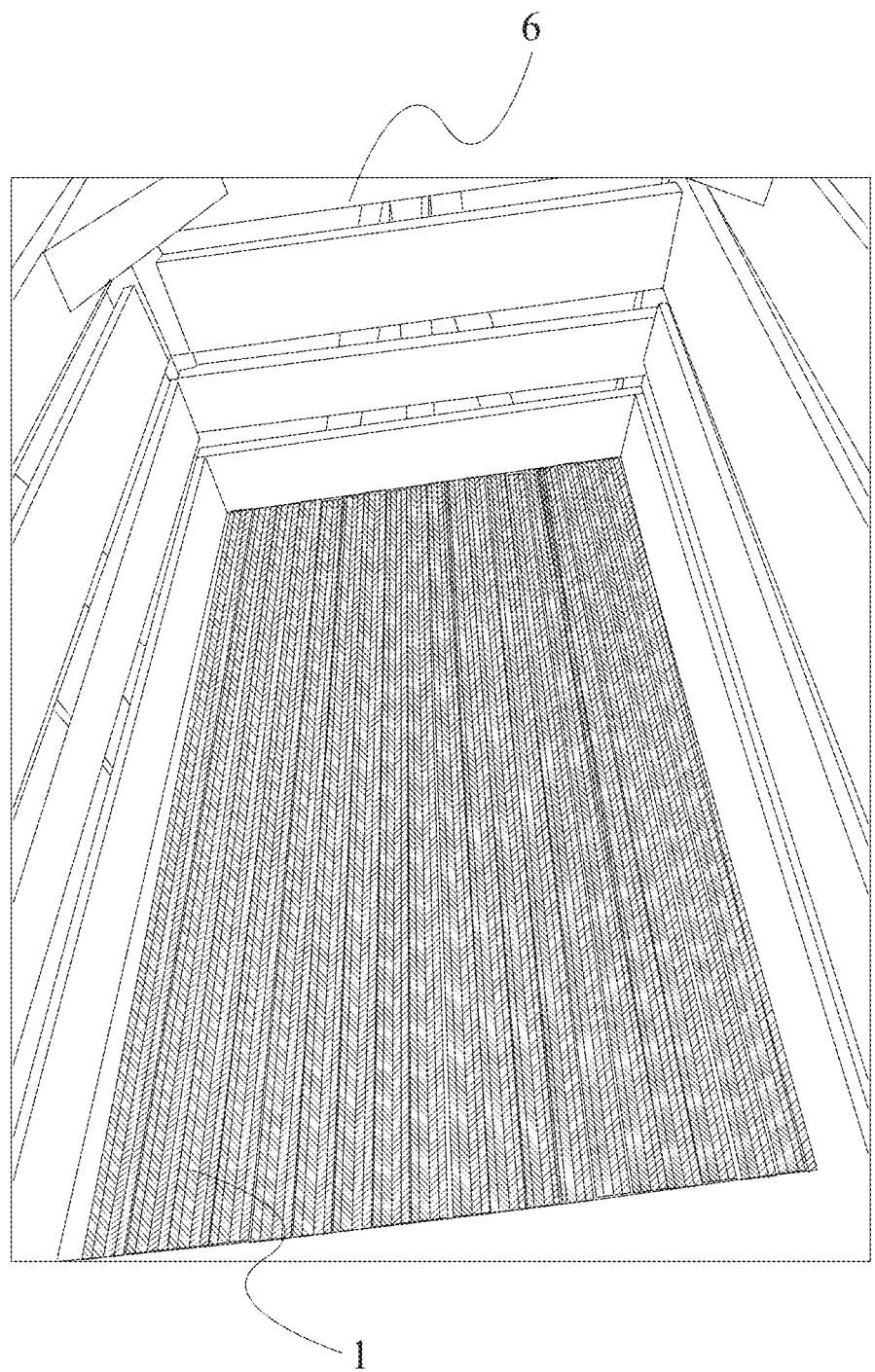
FIG. 4 is a top plan view of the mesh panel within an enclosed region.

In reference to FIG. 3 and FIG. 4, an alternate embodiment of the present invention comprises a planter box 6. In this embodiment, the mesh panel 1, the growth medium layer 3, and the vegetation layer 4 are positioned within the planter box 6. More specifically, the mesh panel 1 may be installed inside the planter box 6, wherein the gopher guard material or mesh panel 1 is positioned approximately 6" below the sol and plants. In other words, the planter box 6 encapsulates the mesh panel 1, the first growth medium layer 3a, the second growth medium layer 3b and the mesh panel 1. Thus, this arrangement further ensures the safety of the plants within the planter box 6, and thus helps with providing a healthy yield. In one embodiment, the planter box 6 may be transparent, so that the plant growth is visible. Further, as seen in FIG. 3 and FIG. 4, the planter box 6 maybe a rectangular box. However, the planter box 6 may comprise any shape, material, size, components, arrangement of components etc. that are known to one of ordinary skill in the art, as long as the intents of the present invention are not altered Thus, the present invention is a safe and cruelty free invention which may be used around gardens, flower beds, planters, lawns, shrubberies, pools, or anywhere gophers or other burrowing animals are a nuisance.

Although the invention has been explained in relation to its preferred embodiment, it is to be understood that many other possible modifications and variations can be made without departing from the spirit and scope of the invention as hereinafter claimed.

What is claimed is:
1. An underground pest control device comprising:
a mesh panel;
a plurality of fasteners;
a first growth medium layer and a second growth medium layer;
a vegetation layer;
the first growth medium layer being laterally offset from the second growth medium layer;
the plurality of fasteners being integrated along terminal edges of the mesh panel;
the mesh panel being positioned between the first growth medium layer and the second growth medium layer;
the vegetation layer being integrated along the first growth medium layer;
the mesh panel being laterally offset from the vegetation layer
the mesh panel having a grating surface;
a plurality of the mesh panels;
the plurality of fasteners interconnecting the plurality of mesh panels along a horizontal plane;
a pest repellent;
the pest repellant being distributed between the first growth medium layer and the second growth medium layer;
a planter box;
the mesh panel, the first growth medium layer, the second growth medium layer, and the vegetation layer being positioned within the planter box.

2. The underground pest control device of claim 1, wherein the first growth medium layer and the second growth medium layer comprise soil.

3. The underground pest control device of claim 1, wherein the pest repellant is positioned adjacent to the mesh panel.

4. The underground pest control device of claim 1, comprising:
the vegetation layer being distributed along a first surface of the first growth medium layer.

5. The underground pest control device of claim 1, wherein the planter box encapsulates the mesh panel, the first growth medium layer, the second growth medium layer and the mesh panel.

6. The underground pest control device of claim 1, wherein the planter box is transparent.

7. The underground pest control device of claim 1, wherein the plurality of fasteners are aluminum zip ties.

8. An underground pest control device comprising:
a mesh panel;
a plurality of fasteners;
a first growth medium layer and a second growth medium layer;
a vegetation layer;
the first growth medium layer being positioned over the second growth medium layer;
the plurality of fasteners being integrated along terminal edges of the mesh panel;
the mesh panel being positioned between the first growth medium layer and the second growth medium layer, wherein the mesh panel has a grating surface;
the first growth medium layer being laterally offset from the second growth medium layer;
the vegetation layer being integrated along the first growth medium layer;
the mesh panel being laterally offset from the vegetation layer; and
a planter box; and
the mesh panel, the first growth medium layer, the second growth medium layer, and the vegetation layer being positioned within the planter box.

9. The underground pest control device of claim 8, comprising:
a pest repellant;
the pest repellant being distributed between the first growth medium layer and the second growth medium layer.

10. The underground pest control device of claim 9, wherein the pest repellant is positioned adjacent to the mesh panel.

11. The underground pest control device of claim 8, wherein the planter box encapsulates the mesh panel, the first growth medium layer, the second growth medium layer, and the mesh panel.

12. The underground pest control device of claim 8, wherein the vegetation layer is distributed along a first surface of the first growth medium layer.

13. An underground pest control device, comprising:
a plurality of mesh panels;
a plurality of fasteners;
the plurality of fasteners being integrated along terminal edges of each of the plurality of mesh panels;
the plurality of fasteners interconnecting the plurality of mesh panels along a horizontal plane; and
a first surface of each of the plurality of mesh panels being positioned opposite to a second surface of each of the plurality of mesh panels across the mesh panels;
the first surface and the second surface being grating surfaces;
a planter box; and
the mesh panel, the first growth medium layer, the second growth medium layer, and the vegetation layer being positioned within the planter box.

14. The underground pest control device of claim 13, wherein the plurality of mesh panels being mounted below ground level.

15. The underground pest control device of claim 13, wherein each of the plurality of fasteners is a metal zip tie.

* * * * *